Inventor

Gilbert Armand Janssens

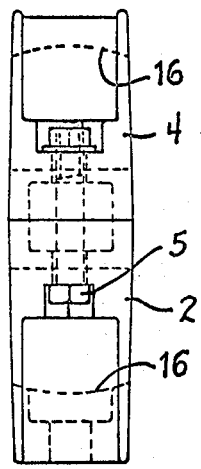
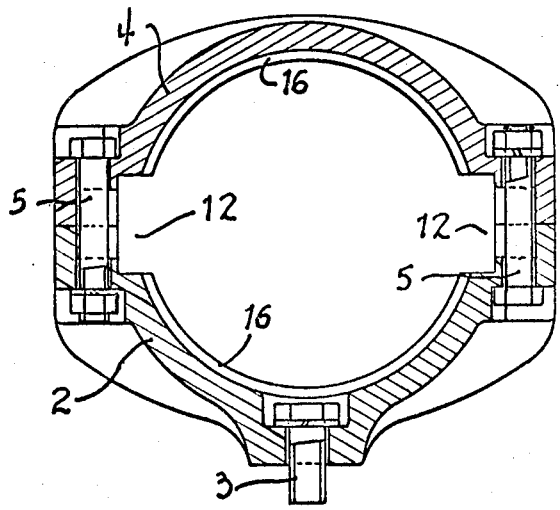
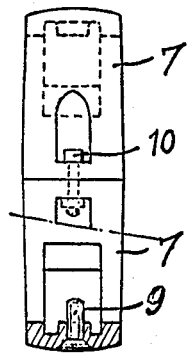
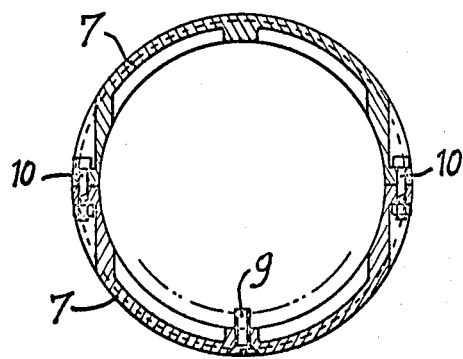
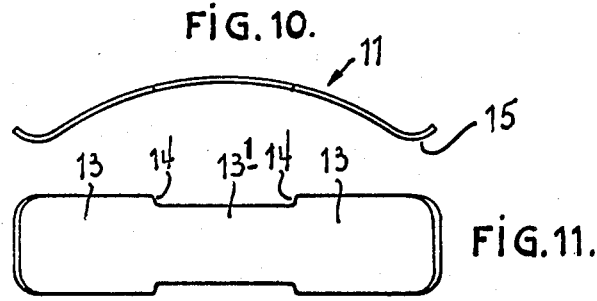

United States Patent Office 3,516,630
Patented June 23, 1970

3,516,630
FIXED BRACKET FOR AN ELECTRIC CONDUCTOR SPECIFICALLY DESIGNED FOR HIGH TENSION
Gilbert Armand Janssens, East Flanders, Belgium, assignor to Burndy Corporation, a corporation of New York
Filed Dec. 11, 1967, Ser. No. 689,423
Claims priority, application Belgium, Dec. 12, 1966, 691,082
Int. Cl. F16l 3/16
U.S. Cl. 248—55                                                     5 Claims

ABSTRACT OF THE DISCLOSURE

A support, for tubular bus bars and similar electrical conductors, which is adapted to allow for angular movement of the conductor relative to an initial position. The conductor is disposed within a bore in a surrounding ring which is provided with a spherical outer surface. The ring, in turn, is captured within a mounting bracket which includes a mating female spherical surface for permitting ball-and-socket movement of the ring. One or a pair of longitudinally extending leaf springs are provided on the mounting bracket to maintain resilient engagement with the conductor.

---

This invention relates to a fixed bracket for an electrical conductor tube, designed for fixing on the cover of an insulator and aims to allow the conductor to adopt angular positions in any direction to the right of the vertical axis of the connection, and in relation to its longitudinal axis, and also to absorb transverse vibrations while at the same time allowing the tube to move longitudinally.

This device is principally characterized in that it comprises a ring in the form of a spherical ring, which contains the conductor tube, and which can move like a ball-bearing in a female spherical housing formed on the internal periphery of a fixed element.

In the practical embodiment of the invention, to avoid transverse vibrations of the conductor tube, two springs are placed crosswise in housings provided in the fixed element, and situated at intervals on the tube.

A certain degree of longitudinal movement is allowed by a stud-hole provided at the bottom of the tube, and by a pin or screw forming an integral part of the spherical ring.

In explanation of the invention there will follow a non-limiting exemplary embodiment, with reference to the drawings in which:

FIGS. 6 to 11 are views of details.

Figure 1:
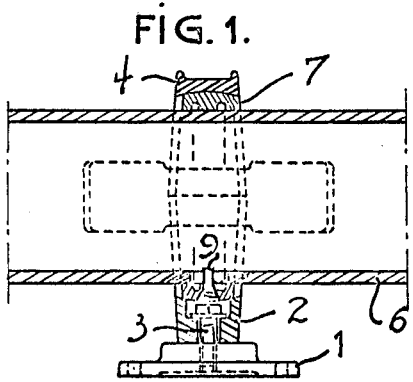
FIG. 1 is a view of the assembly in longitudinal section.
Figure 2:
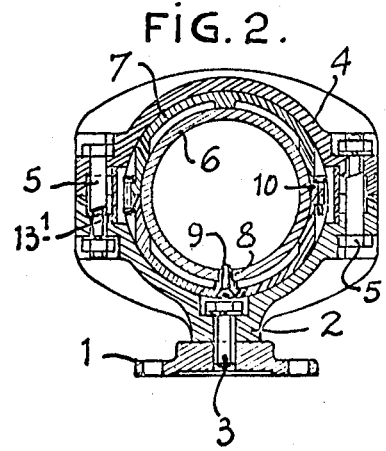
FIG. 2 is a view of the axis of the bracket in transverse section.

In the annexed drawings 1 shows a base designed to be clamped onto the cover of the insulator; 2 is the body of the inventive bracket, usually mounted on the base 1 by a wide steel bolt 3.

The body 2, which thus makes up a fixed piece, is equipped with a clamping head 4, which is mounted on it by bolts 5, generally of aluminum.

The conductor tube 6, usually made of aluminum, can slide in a ring 7 shaped as a spherical ring, this latter in turn being able to move in a spherical housing 16 (FIG. 6) made up by the body 2 and the clamping head 4.

The longitudinal movement of the tube is allowed by a stud-hole 8 made in the bottom of the tube 6, and by a pin or screw 9 as an integral part of the ring 7.

The ring 7 is made in two symmetrical parts connected by screws 10 with nuts, generally UMBRAKO screws.

The device further comprises two springs 11, e.g., made of stainless steel, which are transversely placed in housings 12 provided in the body 2 and the head 4, and are situated at intervals on the tube 6.

These springs 11 end in feet 15 (FIGS. 10 and 11) which come into contact with the tube.

As shown by these illustrations, these springs 11 have, in their central part 13 a minimum height (width), so that the two extreme ends 13 form stops 14 which touch the body 2 and the head 4.

These springs 11 are kept in place during the tightening of the bolts 5 which assemble the body and the head of the connection. They are not clamped in their housing, and are therefore free to move in it.

It will thus be understood that, in relation to the horizontal axis of the tube:

(1) the bracket allows a certain longitudinal movement of the tube 6 because of the stud-hole 8.

Figure 3:
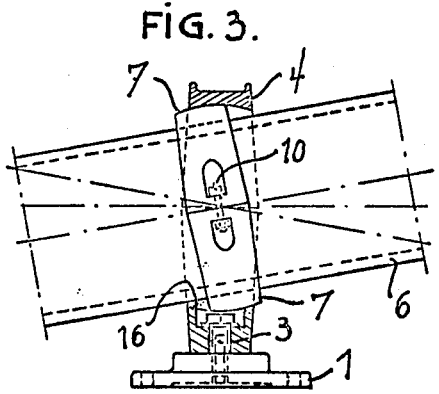
FIG. 3 is a view showing the inclination which the conductor can take up.
Figure 4:
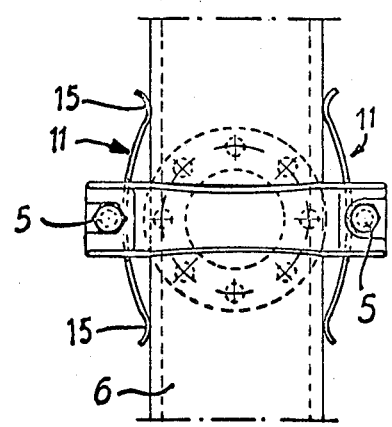
FIG. 4 is a plan view of the assembly.
Figure 5:
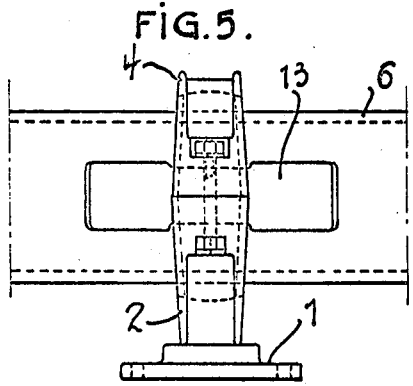
FIG. 5 is an external, profile view of the assemby.

(2) the conductor or tube 6 is free to adopt, to the right of the vertical axis of the connection, in the example shown, angular positions from 0 degrees to 10 degrees (FIG. 3), in any direction (idea in conformity with the principle of a ball-bearing), without damaging the insulator or being itself damaged.

(3) the bracket can absorb transverse vibrations thanks to the stainless steel springs 11.

Thus, by means of the invention, an aerodynamic, anti-vibratory fixed bracket is obtained, which can be made in aluminum.

It can be utilized for indoor and outdoor operations, such as bar-games, and more particularly for high-tension posts.

What is claimed is:

1. A support bracket for tubular electrical conductors, comprising:
   a housing member;
   an opening through said housing member having an inner surface;
   at least a pair of substantially diametrically opposed, concave, partial spherical surface portions formed on the inner surface of said opening through said housing;
   conductor-carrying means disposed within said opening in said housing and having a channel therethrough for receiving a tubular electrical conductor;
   at least a pair of substantially opposed, convex, partial spherical surface portions formed on said conductor-carrying means and engaged in sliding relationship with the said partial spherical surface portions on the inner surface of said opening in said housing; and,
   a pair of spring elements mounted to said housing in substantially opposed relationship across the said opening in said housing, resiliently opposing radially directed motion of a tubular electrical conductor disposed within the said channel in said conductor-carrying means.

2. A support bracket in accordance with claim 1, wherein:
   said housing member comprises a pair of cooperating half-sections, including separable means securing said half-sections together.

3. A support bracket in accordance with claim 1, wherein:
   said pair of spring elements comprises leaf spring members, each having first and second cantilever fingers extending in opposite directions substantially parallel to the central axis of said opening in said housing; and, each of said cantilever fingers terminates in a pad portion positioned to engage the outer surface of a tubular electrical conductor disposed within the said channel in said conductor-carrying member.

4. A support bracket in accordance with claim 1, wherein:

said conductor-carrying means comprises a pair of cooperating half-sections which together define a central circular opening corresponding to said channel; and, said cooperating half-sections can together encompass a tubular electrical conductor therebetween in substantially telescopic sliding relationship.

5. A support bracket in accordance with claim 1, wherein:

said conductor-carrying means further includes a pin member extending substantially radially into said channel, engaging a corresponding slot in a tubular electrical conductor disposed in said channel and limiting the extent of sliding relative motion between such a conductor and said conductor-carrying means.

References Cited

UNITED STATES PATENTS

| | | | |
|---|---|---|---|
| 2,283,899 | 5/1942 | Baker | 248—56 |
| 2,931,672 | 4/1960 | Merritt | 248—56 X |
| 3,018,078 | 1/1962 | Holdren | 248—56 |
| 3,089,454 | 5/1963 | Chronic | 248—56 X |
| 3,295,801 | 1/1967 | McDowall | 248—55 X |

CHANCELLOR E. HARRIS, Primary Examiner

U.S. Cl. X.R.

248—70